Nov. 9, 1954     B. W. SMITH     2,693,737
POWER FED ROUTER MACHINE
Filed July 12, 1951     4 Sheets-Sheet 1
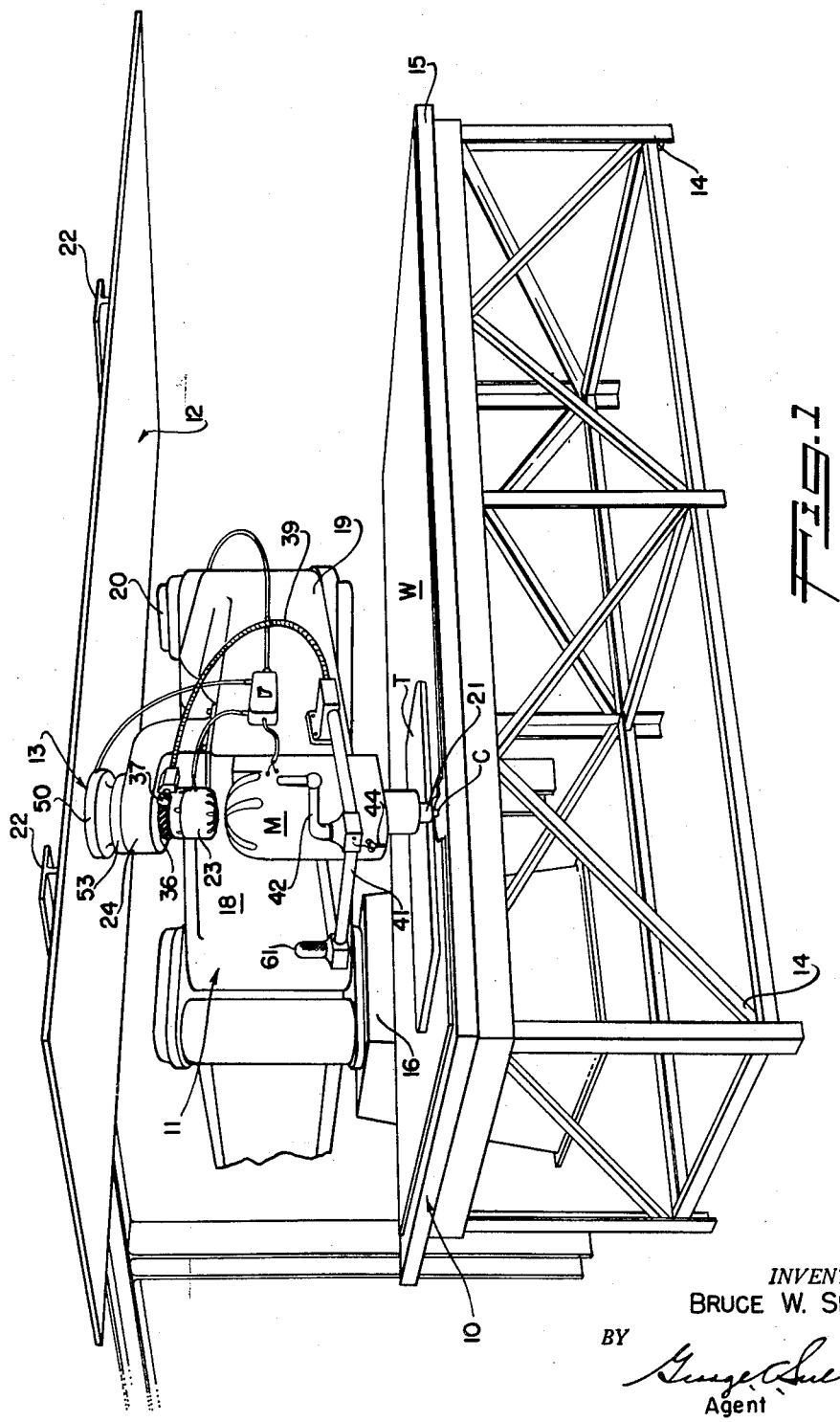
INVENTOR.
BRUCE W. SMITH
BY
Agent

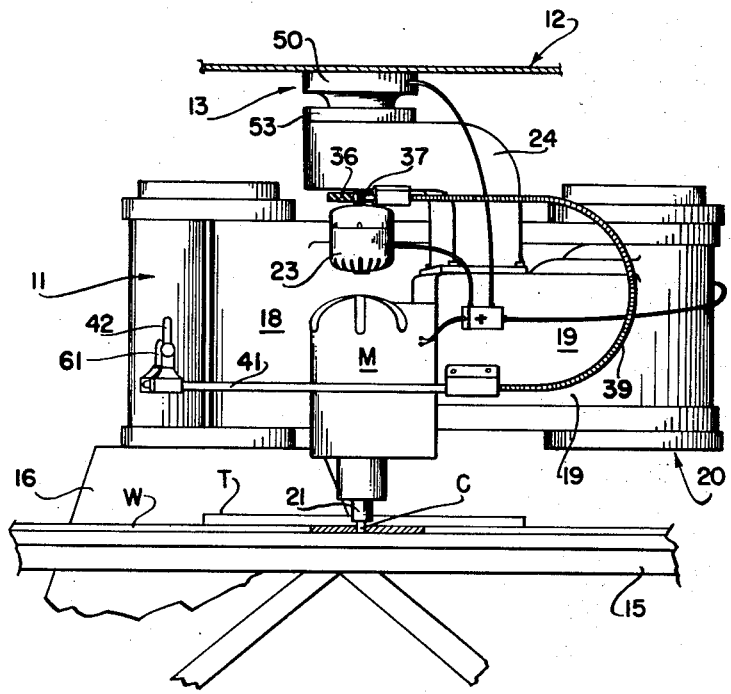
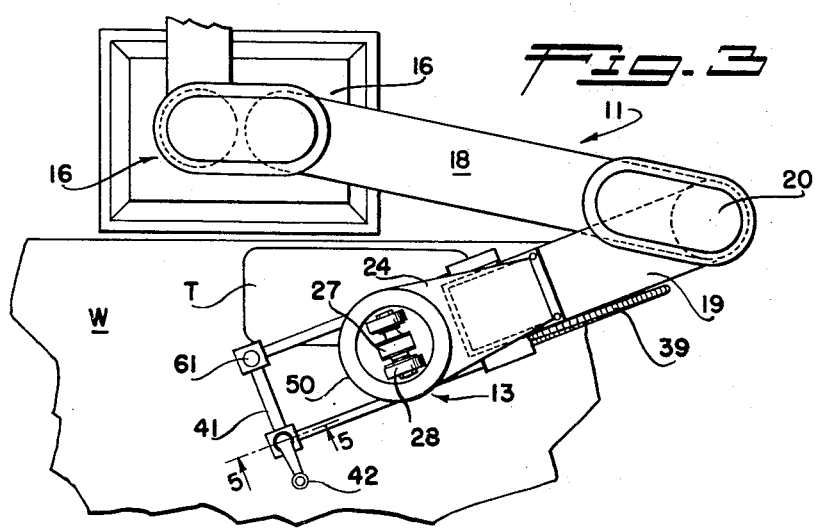

Nov. 9, 1954
B. W. SMITH
2,693,737
POWER FED ROUTER MACHINE
Filed July 12, 1951
4 Sheets—Sheet 3
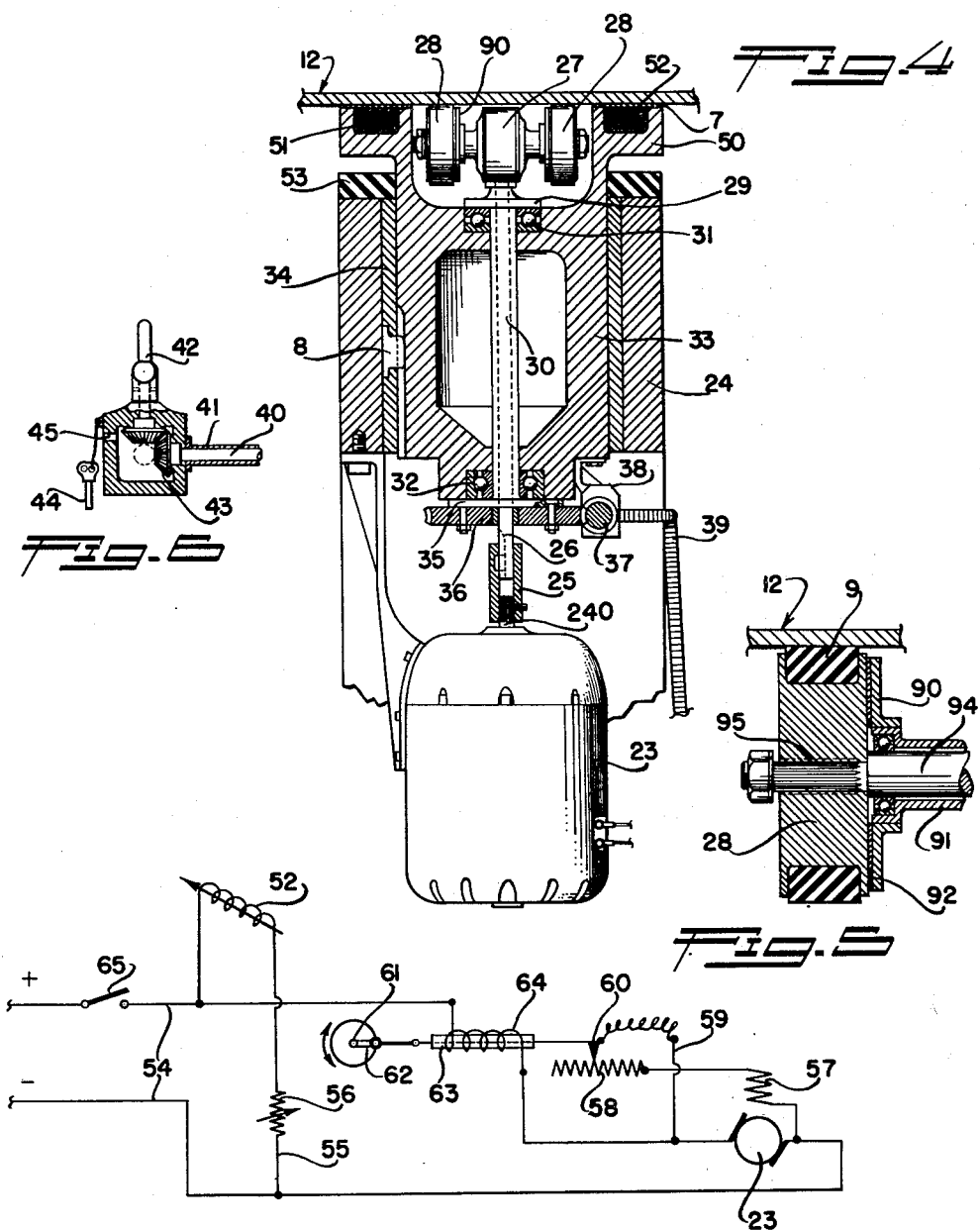
INVENTOR.
BRUCE W. SMITH
BY
George C. Sullivan
Agent

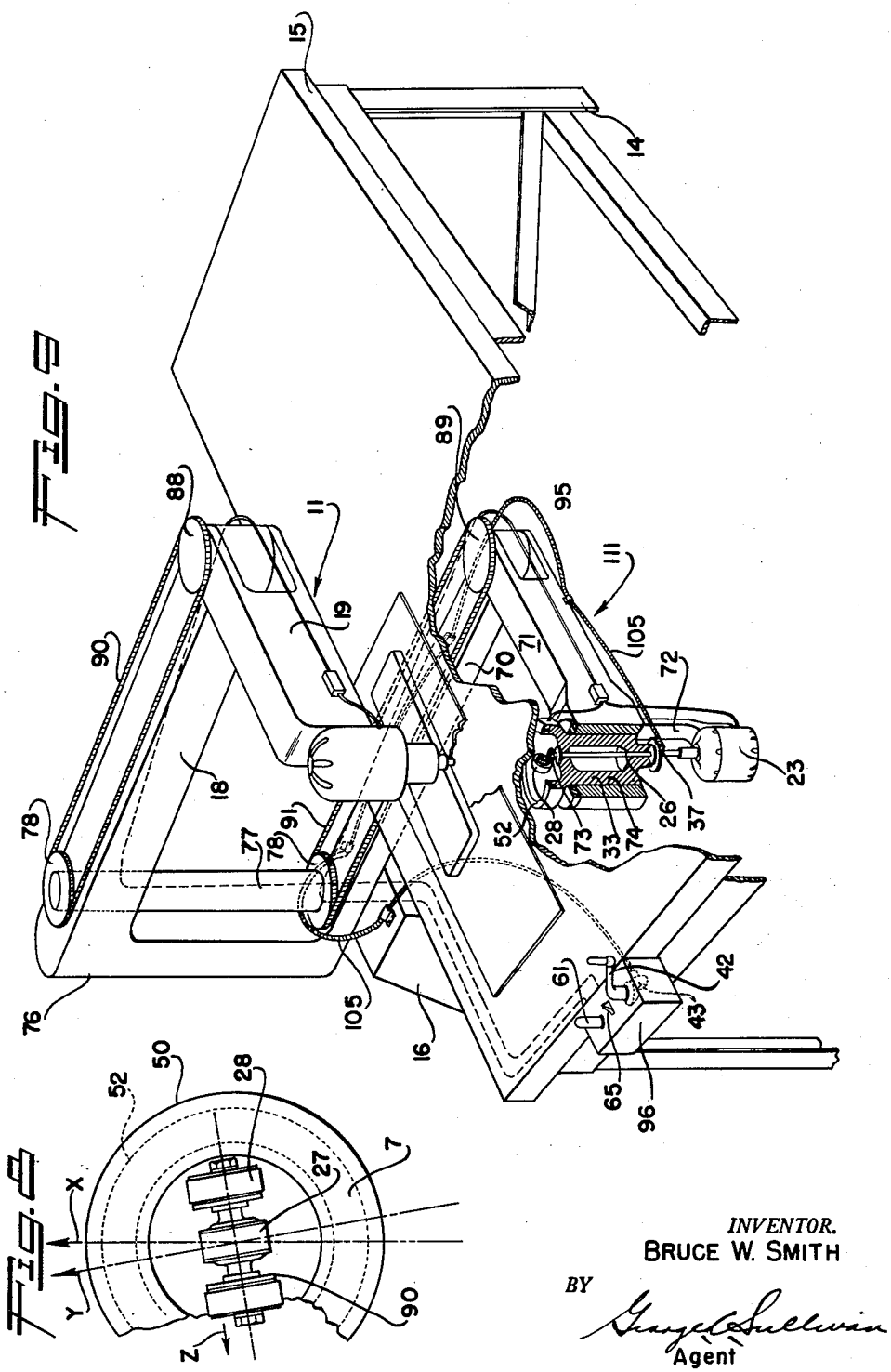

2,693,737

POWER FED ROUTER MACHINE

Bruce W. Smith, North Hollywood, Calif., assignor to Lockheed Aircraft Corporation, Burbank, Calif.

Application July 12, 1951, Serial No. 236,424

12 Claims. (Cl. 90—13)

This invention relates to cutting machines of the general class in which a cutter is directed along a pattern or template and relates more particularly to power driven manually guided routers.

Routing machines, wherein the cutter driving motor is carried on the end of an articulated manually movable arm are used extensively to cut sheet and plate stock. In such machines the cutter is guided along the edge of a form block or template to cut the work to the desired shape. Although the cutter itself is driven by the motor the operator must manually feed and direct the cutter to follow the template. Where the stock to be cut is of increased thickness and/or formed of hard material, the power rating of the power cutting motor may be increased to supply sufficient power to the cutter but considerable additional manual force is also required to feed and guide the cutter. In practice in such situations the operator tires quickly by reason of the excessive exertion required to guide and feed the cutter along the template or form block.

It is an object of the invention to provide a router or machine of this character incorporating power driven means for moving the articulated arm under the control of the operator to feed or advance the cutter.

It is another object of the invention to provide a routing machine, or the like, having an articulated arm movable in a plane and carrying the cutter and cutter motor, the machine being characterized by a powered traction or drive means associated with the arm and acting on a surface remote from and independent of the work and template to feed or move the cutter as directed or guided by the operator. The power actuated means for moving the arm to feed the routing cutter operates on a surface preferably parallel with but removed from the work and template so that it does not in any way complicate or interfere with the work or the cutting operations thereon or obstruct the vision of the operator. In one form of the invention the traction means for moving the arm and cutter cooperates with a plate or surface spaced above and clear of the work table and in another embodiment the traction means is below, and may act on, the under surface of the work table. In both cases the work carrying surface of the table is left entirely free and clear and the operator has full access to the work.

Another object of the invention is to provide a machine of this character in which the operator has full control of both the rate of feed of the cutter and of the guiding or directing of the cutter, the mechanism being such that he has an effective sense of feel of the action of the machine. The control means for the cutter feed motor and the control means for directing the arm and cutter, each have a feed-back to the operator's hand so that he definitely feels the action of the machine and is able to exert control forces proportionate to the powered forces actually being applied in cutting the work. This greatly facilitates the accurate, easy control of the machine.

Another object of the invention is to provide a novel traction device for moving the radial arm and thus feeding the cutter, which device includes one or more power driven wheels for operating on a surface parallel with the work table and including magnetic means for assuring effective engagement or traction of the wheels with said surface and for assuming the weight, or a portion of the weight, of the drive or feed means.

It is a further object of the invention to provide a machine of the character referred to in which the traction means of the manually directable power or feed mechanism acts or travels on the under surface of the work table whereby the self-same table serves both to carry the template and the work and to constitute a track or surface for the traction means.

A still further object of the invention is to provide a machine that may be manually controlled from either the radial arm itself or from a panel or control box located at the edge of the work table, or elsewhere.

Other objectives and features of the invention will become apparent from the following detailed description of typical preferred embodiments, throughout which description reference is made to the accompanying drawings wherein:

Figure 1 is a front perspective view of one form of routing machine of the invention;

Figure 2 is an enlarged vertical, fragmentary, sectional view of the machine illustrated in Figure 1, showing the radial arm and parts associated therewith in front elevation;

Figure 3 is a fragmentary plan view showing the articulated arm and traction means thereon;

Figure 4 is an enlarged vertical detailed sectional view of the traction means and a portion of its plate or surface with the motor appearing in elevation;

Figure 5 is an enlarged vertical sectional view of one of the feed or traction wheels and adjacent parts;

Figure 6 is an enlarged fragmentary sectional view taken as indicated at line 6—6 on Figure 3;

Figure 7 is a wiring diagram of the circuits embodied in the machine illustrated in Figure 1;

Figure 8 is a fragmentary plan view of the feed wheels and adjacent parts; and

Figure 9 is a more or less schematic perspective view of another form or embodiment of the invention with a portion of the work table broken away to illustrate the traction means and parts associated therewith, a part of the traction means appearing in vertical cross section.

The machine of the invention, as illustrated in Figures 1 to 8 inclusive, may be said to comprise, generally, a support or work table 10 for carrying the workpiece W and the router block or template T, an articulated radial arm 11 carrying the motor M for operating the cutter C, a surface or plate 12 spaced from the table 10, manually directable traction or feed means 13 associated with the arm 11 and cooperable with the plate 12 to feed or move the arm 11, and controls for the motor M and the means 13.

The table 10 of course may be of any selected or required type and construction. In the case illustrated the table 10 has a series of legs or supports 14 carrying a flat horizontal top or plate 15 which may be constructed of wood, metal, or a combination of such materials. This table top 15 carries the workpiece W which I have shown as a flat sheet or plate and also carries the router block or template T.

The arm 11 is arranged over the table 10 and serves to carry the cutter motor M and parts associated therewith. The arm 11 has one end pivotally mounted on a column 16 for movement about a vertical axis and in a plane parallel with the table top 15. The column 16 is at one edge of the table 10 and the arm 11 is articulated or made up of two or more sections hinged or pivoted together to permit free movement of the cutter motor M and cutter C above the table. In the simple case illustrated, the arm 11 has two sections 18 and 19 hinged together at 20, the other end of the arm section 18 being supported on the column 16. The cutter motor M is secured to the outer end of the arm section 19 and the cutter C projects beyond the lower side of the arm 11 to act on the work W. As best illustrated in Figure 2, the arm 11 is spaced above and clear of the work W and it will be seen that the arm may be manipulated to guide or direct the cutter C as required. A tracer 21 is arranged immediately above the cutter C to ride along the edge of the form block or template T to guide the cutter as required.

In the embodiment of the invention being described, the plate or surface 12 is spaced above the table 10. The surface 12 is preferably parallel with the work supporting surface 15 of the table. In practice the plate or surface 12 may be carried by a suitable supporting structure having horizontal beams 22. The plate or surface 12, which forms the track or field on which the traction or feed means 13 operates, is preferably constructed of steel or other ferrous metal and is sufficiently large or extensive to cover the entire range of intended or possible movement of the motor M and cutter C. It will be observed in Figures 1 and 2 that the overhead plate or surface 12 is spaced clear and free of the table 10 where it does not in any way interfere with the operations to be performed at the table.

The manually directed traction or feed means 13 is a feature of the invention. This mechanism which is associated with the radial arm 11 is power driven and is operable to swing or move the arm 11 and, therefore, the cutter C as directed or guided by the operator. The means 13 includes an electric motor 23 secured on the underside of a bracket 24 on the outer section 19 of the arm 11. The motor 23 is arranged with its shaft 240 vertically disposed and in vertical alignment with the axis of the cutter C. The shaft 240 projects from the upper end of the motor 23 and has a tubular extension 25 which in turn slidably receives a shaft 26, see Figure 4. The shaft 26 is splined or keyed in the tubular extension 25 to be driven by the motor 23 and yet is adapted to move vertically relative to the motor. The shaft 26 continues upwardly to a differential gearing 27 which, in turn, drives two wheels 28 rotatable about a horizontal axis. These wheels 28 serve to ride on or engage the under side of the horizontal surface 12 and their treads or peripheries are roughened or provided with appropriate friction material 9 to have good traction on the surface. As differential gears of the type employed are conventional and well known, the details of the gearing 27 are omitted from the present description.

The assembly of the differential gearing 27 and wheels 28 is secured to a collar 29 which, in turn, is secured on the upper end of a tubular shaft 30. The tubular shaft 30 surrounds the motor driven shaft 26 and the two shafts 26 and 30 are related for relative rotation. The shaft 30 is carried by appropriate bearings 31 and 32 arranged in the ends of a relatively large concentric sleeve or block 33. This block 33 is slidable vertically in the bracket 24, being keyed or splined at 8 in a bushing 34 in the bracket. The above described collar 29 cooperates with the bearing 31 which is in the nature of an axial thrust bearing while a second collar 35 is secured on the lower end of the tubular shaft 30 to cooperate with the bearing 32 at the lower end of the block 33. With this construction the tubular shaft 30 which carries the gearing 27 and wheels 28 is free to turn in the block 33 but is constrained to move vertically with the block. It will be observed that the axis of turning movement of the shaft 30 and wheels 28 is coincident with the axis of rotation of the cutter C.

Means is provided for manually turning the shaft 30 to guide or direct the wheels 28 so that the wheels serve to drive or feed the arm 11 as directed by the operator. This means includes a worm wheel 36 attached to the collar 35 and meshing with a worm 37 rotatably carried by a bearing 38 on the block 33. A flexible shaft 39 is attached to the form 37 and extends to an appropriate manual operating or control station. The flexible shaft 39 has sufficient slack to allow free, full swinging or movement of the arm 11. In the construction illustrated the flexible shaft 39 connects with a shaft 40 arranged in a handle-like frame or housing 41 associated with the outer arm section 19. As shown in Figure 6 a hand lever or crank 42 is operatively connected with this shaft 40 by beveled gears 43. A pin or key 44 may be inserted through an opening 45 in the housing 41 to lock up the gearing 43 when it is not desired or required to guide the wheels 28 in which event the handle-like housing 41 may be grasped and employed to manually guide the arm 11 and cutter C. It is believed that it will be apparent that upon removal of the key 44 the crank 42 may be operated to steer or guide the wheels 28 and thus direct the arm 11 and cutter C as desired.

It is preferred to incorporate a magnetic means in the manually directable power feed mechanism 13 to insure a proper driving engagement or traction of the wheels 28 with the surface 12. This means includes an annular head or flange 50 of enlarged diameter on the upper end of the block 33. The flange 50 surrounds the pair of wheels 28 with suitable clearance and has an annular recess 51 in its upper surface. This recess 51 faces or opposes the surface 12 and contains a winding or electromagnet 52. A thin protective plate 7 may cover the upper end of the magnet. When the magnet 52 is energized, its field or flux acts on the ferrous metal surface 12 to raise the block 33 and thus urge the wheels 28 against the surface 12. The magnetic action also serves to remove the weight of the block 33, wheels 28, gearing 27, shafts 26 and 30, etc. from the arm 19 providing for a freer action of the machine. Upon deenergization of the magnet 52 the block 33 drops a short distance to free the wheels 28 from the surface 12. A stop 53 of rubber, or the like, is provided on the upper end of the bracket 24 to limit this downward movement of the block.

In order to provide a better sense of feel for the operator manipulating the steerable feed or drive means 13, I provide braking plates or discs 90 fixed to the housing 91 of the differential gearing 27 to oppose the inner sides of the wheels 28. This is best illustrated in Figures 4 and 5. The discs 90 have friction material 92 on their faces engageable by the sides or ends of the adjacent wheels. The wheels 28 are slidably keyed or splined on their shafts 94, as at 95 for limited axial movement to be individually movable into and out of engagement with their respective brake discs 90. When operating the cutter C along the edge of the template T the handle or crank 42 may be held so as to maintain the wheels 28 at a slight angle with respect to the direction of advancement of the cutter. This causes one wheel 28 to ride against its respective brake disc 90 while the other wheel is spaced clear of its disc 90 so that there is a resultant component force tending to turn the wheel and gearing assembly 28—27 about a vertical axis. This force is "fed back" to the operator's hand grasping the crank 42 and any deviation in the position or inclination of the wheels 28 is immediately apparent to the operator. Thus the operator has a "sense of feel" in guiding the cutter C. In Figure 8, the arrow X indicates the direction of feed or movement of the cutter C, the arrow Y the pitch or inclination of the wheels 28, which may be exaggerated, and the arrow Z the resultant component force.

A control circuit is provided for the traction or feed motor 23 whereby the operator may vary the speed of the drive or feed wheels 28 as the arm 11 is directed or guided around the template T. The circuit is such that the operator has a "feel" of the speed and action of the wheels 28. As illustrated in Figure 7, a circuit 54 extends from a suitable power source and leads 55 extend from this circuit to the electro-magnet 52. A suitable variable resistance 56 may be connected in the magnet circuit 55. The circuit 54 continues to the motor 23 and the field winding 57 of the motor has one terminal connected with one side of the armature and its other terminal is connected with a resistor 58. A lead 59 extends from the other side of the motor armature to a contractor 60 which is movable along the resistor 58 to vary the current flow to the winding 57. The means for manually operating or moving the contactor 60 includes a handle 61 adapted to be turned or rotated by the operator. The handle 61 may be mounted on the grip or housing 41, above described, and has a crank 62. The crank 62, is in turn connected with the armature 63 of a solenoid 64, the armature being in turn connected with the contactor 60. It will be seen that turning of the handle 61 displaces the armature 63 in the winding of the solenoid 64 giving a feed-back or sense of feel to the operator's hand proportional to the adjustment or movement of the contactor 60 on the resistor 58, and therefore proportional to the speed of the feed motor 23. A main control switch 65 is preferably provided in the circuit 54 to initiate and terminate operation of the feed motor 23 and magnet 52.

In Figure 9 I have illustrated another embodiment of the invention which utilizes the under surface of the table top 15 as the field or track upon which the feed wheel or wheels operate. In this case the above described surface 12 may be eliminated and the under surface of the table top 15 is formed of steel or other ferrous metal material. The arm 11, the motor M, the cutter C, etc. may be the same as above described. In this form of the machine there is an arm 111 below the table top 15 corresponding in configuration with the arm 11. Thus where the arm 11 has two sections 18 and 19, the arm 111 has two sections 70 and 71 of the same or proportionate lengths. The feed motor 23 is secured to the outer end of the arm 71 by a bracket 72 and its shaft drives the shaft 26, as in the previously described form of the invention. In this particular case I have shown the shaft 26 driving a single wheel 28 through beveled gearing 73, it being understood that two wheels may be employed as above described. Also, it will be seen that the single wheel 28 may be used in the device of Figures 1 to 6 inclusive if preferred. The block 33 and magnet 52 may be the same as above described except that in this case the block is carried in the opening 74 in the lower arm section 71. In this type of machine the inner end of the arm section 18 and the inner end of the arm section 70 are connected to move in unison. I have shown them integrally or rigidly connected by a vertical web or bridge 76. The outer arm sections 19 and 71 are also connected to move simultaneously and in the same directions. The means for effecting this simultaneous and like or proportionate movement includes a vertical rotatable shaft 77 provided with sprockets 78 at the upper sides of the arm sections 18 and 71. Sprockets 88 and 89 are respectively connected with the inner pivoted ends of the arm sections 19 and 71 and chains 90 and 91 operate over the sprockets 78 and 88 and 78 and 89. It will be seen that with this arrangement, movement of the arms 70 and/or movement of the arms 70 and 71 caused by action of the drive wheels 28 is transmitted to the upper arm 11 to cause like movement of the arm sections 18 and 19. While I have shown the arm sections 70 and 71 as being of the same length as the sections 18 and 19 respectively, it will be understood that the sections of the lower arm need not be of the same lengths as the sections of the upper arms so long as they bear the same relationship to one another as the arms 18 and 19 bear to one another.

The means for guiding or directing the wheel or wheels 28 may be substantially the same as in the other machine and includes a flexible shaft 105 extending from the worm 37 to the gearing 43. The shaft 105 is trained along the arms 70 and 71 with suitable freedom or slack. I have shown a control panel or box 96 arranged at a convenient location on the edge of the table 10 and the gearing 43 may be housed therein with the operating or guiding handle 42 at the top of the box. The circuit for energizing and controlling the motor 23 and magnet 52 may be the same as illustrated in Figure 6, and the crank 42, handle 61 and switch 65 are preferably provided at the box 96 to be conveniently accessible to the operator.

It is believed that the operation of the machines will be readily understood from the foregoing detailed description. In the machine illustrated in Figures 1 to 8 inclusive, the operation of the feed mechanism is initiated by closing the switch 65. The cutter motor M is, of course, put into operation in the usual manner and the handle 42 is manipulated to feed the cutter C to a position where the tracer 21 is against the template T. Thereafter the operator moves the handle 42 to guide the arm 12, the wheels 28 being steered or directed as above described, to move or feed the arm 11. The magnet 52 serves to hold the wheels 28 in effective engagement with the surface 12 so as to move the arm and feed the cutter C against the work W. The speed of operation of the feed motor 23 is governed by the handle 61, the operator sensing the action of the feed means by the feed-back force exerted on the handle by the solenoid 64. Because the wheels 28 actuated and guided as above described, actually move the arm 11 as directed by the operator, the operator is relieved of the greater part of the exertion heretofore required in guiding or operating the router arm. The machine illustrated in Figure 9 is operated in the same manner. In this case the wheel 28 acts on the under surface of the table top 15 to feed or move the arm 11 through the medium of the web 76 and the chain and sprocket drive arrangement described above. In this case the operator need not engage or manipulate the moving arm 11 and the operation may be controlled entirely from the control box 96. In this connection it is to be understood that the control box 96 with its switch and handles may, if desired, be employed in the machine illustrated in Figures 1 to 6 inclusive, instead of using the handle-like housing 41 associated with the movable arm 11.

Having described only typical forms of the invention I do not wish to be limited to the specific details herein set forth, but wish to reserve to myself any variations or modifications that may appear to those skilled in the art and fall within the scope of the following claims.

I claim:

1. In a machine of the character described; a work-supporting surface, a power driven cutter for acting on the work, an articulated swingable arm carrying the cutter for movement and direction, a second surface spaced from and generally parallel with the work supporting surface, and manually directable power driven means mechanically connected with said articulated arm and acting on said second surface to feed the cutter including at least one steerable wheel engaging said second surface, power means for driving the wheel, manually operable means for steering the wheel comprising a steering handle, and a manual speed control for the power means, said handle and manual control being on the arm and adjacent the cutter.

2. In a machine of the character described, a horizontal work-supporting surface, a power driven cutter for acting on the work, an articulated swingable arm carrying the cutter for movement and direction, a second surface generally parallel with the first named surface and facing downwardly toward the same, and manually directable power driven means mechanically connected with said articulated arm to move the same including at least one wheel engaging upwardly against said second surface and supported to be steered about an axis extending in the same direction as the axis of rotation of the cutter, power means for driving the wheel, and manually operable means for steering the wheel about said axis including a steering handle on the arm adjacent the cutter.

3. In a machine of the character described; a first surface facing upwardly for supporting a piece of work, a second surface parallel therewith and facing downwardly toward the first surface, a power driven rotatable cutter for acting on the work, an articulated arm carrying the cutter for movement across the first surface, and manually directable power actuated means mechanically connected with the arm for moving the arm to feed the cutter including traction wheel means acting on the second surface and steerable about an axis vertically aligned with the axis of rotation of the cutter, power means for driving the wheel means to feed the cutter, a manually operable control for the power means, and manually operable means for turning the wheel means about said axis to steer the same and including a manual steering handle, said manually operable control and said handle being on the arm adjacent the cutter.

4. In a machine of the character described; a first surface for supporting a piece of work, a second surface parallel therewith, the second surface facing downwardly, a power driven rotatable cutter for acting on the work, an articulated arm carrying the cutter for movement across the first surface, and manually directable power actuated means mechanically connected with the arm for moving the arm to feed the cutter including traction wheel means acting on the second surface and steerable about an axis parallel with the axis of rotation of the cutter, means for supporting the wheel means for vertical movement, magnetic means for urging the wheel means upwardly against said second surface and for assuming the weight of the wheel means, power means for driving the wheel means to feed the cutter, a manually operable control for the power means, and manually operable means for turning the wheel means about said axis to steer the same.

5. In a machine of the character described; a first surface for supporting a piece of work, a second surface spaced above the first surface and parallel therewith, a power driven rotatable cutter for acting on the work, an articulated arm carrying the cutter for movement across the first surface, and manually directable power actuated means mechanically connected with the arm for moving the arm to feed the cutter including traction wheel means acting on the second surface and steerable about an axis parallel with the axis of rotation of the cutter, power means for driving the wheel means to feed the cutter, a manually operable control for the power means carried by the arm, and manually operable means for turning the wheel means about said axis to steer the same and carried by the arm adjacent the cutter.

6. In a machine of the character described; a first surface for supporting a piece of work, a second surface spaced below the first surface and parallel therewith, a power driven rotatable cutter for acting on the work, an articulated arm carrying the cutter for movement across the first surface, and manually directable power actuated means mechanically connected with the arm for moving the arm to feed the cutter including traction wheel means acting on the second surface and steerable about an axis parallel with the axis of rotation of the cutter, power means for driving the wheel means to feed the cutter, a manually operable control for the power means, and manually operable means for turning the wheel means about said axis to steer the same.

7. In a machine of the character described; a first surface for supporting a piece of work, a second surface parallel therewith, a power driven rotatable cutter for acting on the work, an articulated arm carrying the cutter for movement across the first surface, and manually directable power actuated means mechanically connected with the arm for moving the arm to feed the cutter including traction wheel means acting on the second surface and steerable about an axis parallel with the axis of rotation of the cutter, power means for driving the wheel means to feed the cutter, a manually operable control for the power means on the arm adjacent the cutter, manually operable means for turning the wheel means about said axis to steer the same comprising handle means carried by the arm adjacent the cutter, and flexible drive means operatively connecting the handle means with the steerable wheel means.

8. In a machine of the character described; a first surface for supporting a piece of work, a second surface parallel therewith, the second surface facing downwardly, a power driven rotatable cutter for acting on the work, an articulated arm carrying the cutter for movement across the first surface, and manually directable power actuated means mechanically connected with the arm for moving the arm to feed the cutter including traction wheel means acting on the second surface and steerable about an axis parallel with the axis of rotation of the cutter, the wheel means having limited vertical movement toward and away from said second surface, power means for driving the wheel means to feed the cutter, magnetic means for urging the wheel means upwardly against the second surface to have effective traction therewith and for assuming the weight of the wheel means, and manually operable means for steering the wheel means to guide the cutter.

9. In a machine of the character described; a first surface for supporting a piece of work, a second surface parallel therewith, the second surface facing downwardly, a power driven rotatable cutter for acting on the work, an articulated arm carrying the cutter for movement across the first surface, and manually directable power actuated means mechanically connected with the arm for moving the arm to feed the cutter including traction wheel means for acting upwardly against the second surface and steerable about an axis parallel with the axis of rotation of the cutter, the wheel means having limited vertical movement toward and away from said second surface, power means for driving the wheel means to feed the cutter, magnetic means for urging the wheel means upwardly against the second surface to have effective traction therewith, means for regulating the magnetic means, and manually operable means for steering the wheel means to guide the cutter.

10. In a machine of the character described; a generally horizontal first surface for supporting a piece of work, a second surface parallel therewith and spaced above the first surface to face downwardly, a power driven rotatable cutter for acting on the work, an articulated arm carrying the cutter for movement across the first surface, and manually directable power actuated means mechanically connected with the arm for moving the arm to feed the cutter including traction wheel means acting on the second surface and steerable about an axis parallel with the axis of rotation of the cutter, the wheel means including a pair of spaced wheels for acting upwardly against the second surface and spaced at opposite sides of said axis, differential gearing for the wheels, power means for driving the wheels to feed the cutter, each wheel having limited axial movement relative to the gearing, a non-rotatable braking disc at a side of each wheel engageable thereby to retard rotation thereof when the axis of rotation of the wheel is not normal to the direction of travel of the wheels on said second surface, and manually operable means for steering the wheel means.

11. In a machine of the character described; a first surface for supporting a piece of work, a second surface parallel therewith, a power driven rotatable cutter for acting on the work, an articulated arm carrying the cutter for movement across the first surface, and manually directable power actuated means mechanically connected with the arm for moving the arm to feed the cutter including traction wheel means acting on the second surface and steerable about an axis parallel with the axis of rotation of the cutter, power means for driving the wheel means to feed the cutter, a manually operable control for the last named power means, including electromagnetic means offering resistance to manual manipulation proportional to the speed of operation of the wheel means, and manually operable means for turning the wheel means about said axis to steer the same.

12. A machine of the character described comprising a table, the upper surface of which carries a workpiece, an articulated first arm movable over the table, a motor on the arm, a cutter driven by the motor to act on the workpiece, a control for the motor, and manually steerable power driven means for moving the arm to guide the cutter comprising an articulated second arm movable under the table, a traction wheel on the second arm for acting on the under surface of the table, the wheel being supported on the second arm for movement about a vertical axis, power means for driving the wheel, means mechanically connecting the two arms whereby the second arm is adapted to move the first arm, and manually operable means for moving the wheel about said axis to steer or guide the cutter.

References Cited in the file of this patent

UNITED STATES PATENTS

| Number | Name | Date |
|---|---|---|
| 1,898,555 | McCune | Feb. 21, 1933 |
| 2,015,330 | Anderson | Sept. 24, 1935 |
| 2,057,820 | Corwin | Oct. 20, 1936 |
| 2,067,962 | Zwick | Jan. 19, 1937 |
| 2,494,532 | Ager | Jan. 17, 1950 |
| 2,549,024 | Siepe | Apr. 17, 1951 |

FOREIGN PATENTS

| Number | Country | Date |
|---|---|---|
| 513,848 | Great Britain | Oct. 31, 1938 |